E. E. TAYLOR & D. H. ELKINS.
SUPPLEMENTAL LIGHT FOR LAMPS.
APPLICATION FILED JAN. 16, 1909.
926,082.
Patented June 22, 1909.
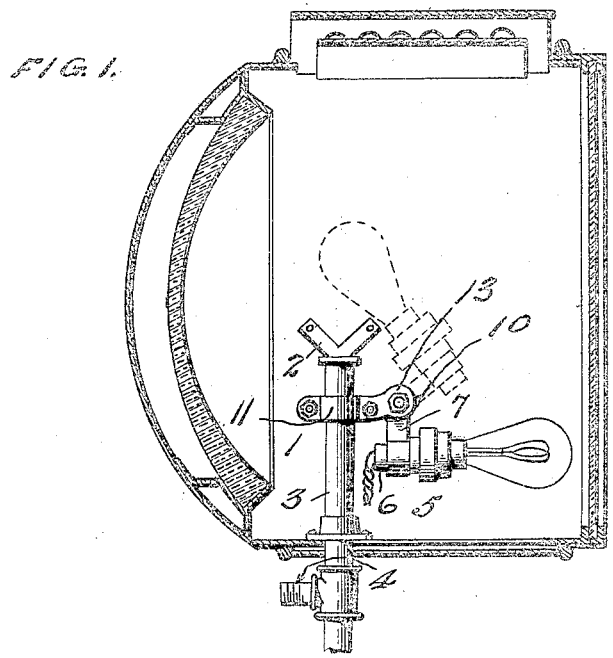
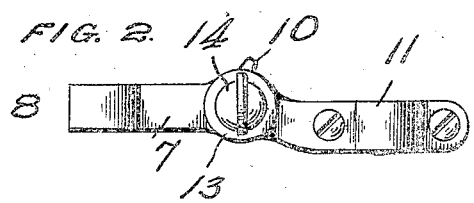
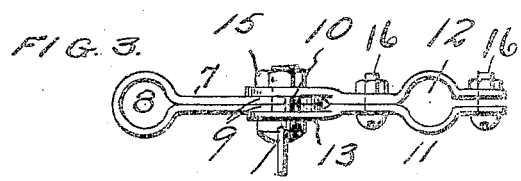
WITNESSES
C. K. Davis
J. E. Moore
INVENTORS
E. E. Taylor,
D. H. Elkins,
By F. E. Stebbins, Attorney.

UNITED STATES PATENT OFFICE.

EDWARD E. TAYLOR AND DAVID HENRY ELKINS, OF AMESBURY, MASSACHUSETTS, ASSIGNORS TO WILLIAM GRAY AND LAMBERT HOLLANDER, OF AMESBURY, MASSACHUSETTS.

SUPPLEMENTAL LIGHT FOR LAMPS.

No. 926,032.        Specification of Letters Patent.        Patented June 22, 1909.

Application filed January 16, 1909. Serial No. 472,638.

*To all whom it may concern:*

Be it known that we, EDWARD E. TAYLOR and DAVID H. ELKINS, citizens of the United States, residing at Amesbury, in the county of Essex and State of Massachusetts, have invented certain new and useful Improvements in Supplemental Lights for Lamps; and we do hereby declare the following to be a full, clear, and exact description of the invention, such as will enable others skilled in the art to which it appertains to make and use the same.

The object of the invention is the provision of a supplemental light for lamps, and especially for such lamps as are adapted for use on automobiles and other vehicles which are propelled through much frequented thoroughfares and highways.

In city streets where there is much travel the bright acetylene light is blinding to the users of automobiles and other vehicles who are traveling in an opposite direction and to persons who come within the area covered by the light, and thereby frequent accidents are occasioned. A soft and less glaring light is required under the circumstances mentioned and it is desirable that a supplemental light be provided and one which may be brought into use quickly to take the place of the acetylene light, and vice versa, as the automobile passes from relatively dark streets to crowded ones and from the latter to the former.

Our invention consists in the combination with a lamp of a supplemental light emitting burner or other device, such, for example, as an electric incandescent lamp, which can be shifted from a position which it occupies when not in use to a position identical with or adjacent to that occupied by the regular gas or other burner when the latter is not in use, and which can also be moved out of the way when the regular burner or light is to be again put in use.

Further, it consists in the combination with an acetylene gas burner of a supplemental burner or lamp which can be shifted, turned or folded to approximately the position occupied by the flame of the gas burner, and also shifted, turned or folded to a position away from the said gas burner.

The accompanying drawing illustrates an example of the physical embodiment of the invention constructed and arranged according to the best mode we have so far devised for the practical application of the principle.

Figure 1 shows a lamp with an acetylene gas burner and also a supplemental light emitting device. Fig. 2 is a side view of the means for supporting the supplemental device. Fig. 3 is a top plan view of Fig. 2.

Referring to the several figures, the numeral 1 designates an acetylene gas lamp such as is adapted for use in connection with automobiles; 2, a gas burner of well known construction; 3, the hollow burner standard or pipe; 4, the hollow tip which communicates with the standard and burner and to which is attached the rubber tube or hose, through which latter the gas passes from the generator to the burner; 5, the supplemental lighting device, in this instance an incandescent electric lamp, provided with conductors in communication with a suitable electric generator (not shown); 6, a tube which supports the lamp and socket; 7, a clip bent upon itself to form an opening 8 to receive the tube 6 and with its ends in parallel relation; 9, the enlarged and perforated ends of the clip; 10, lugs projecting from the curved edges of the ends of the clip and serving to limit the rotary movement of the same; 11, a clip fashioned to form a circular opening 12 for the reception of the gas burner standard; 13, the enlarged and perforated ends of the clip, the said ends being spaced apart to receive between them the enlarged ends 9 of the clip 7, as shown; 14, a butterfly nut with a threaded shank passed through the perforations in the enlarged ends of both the clips 11 and 7, as clearly illustrated; 15, the clamping nut proper on the shaft, said parts with the threaded shaft forming a pivot about which the clip 7 and lamp can be turned, the upward movement being limited by the lugs 10, as is obvious; and 16 are two threaded screws passed through holes in clip 11 and provided with nuts whereby the said clip can be adjusted to and removed from the gas burner standard with facility.

It will be observed that the reflector and gas burner are fixed and that the gas burner is located in front of the reflector.

When the acetylene gas burner is in use and the automobile passes from a relatively dark street to a street containing other vehicles or foot passengers the acetylene burner is extinguished and the electric lamp turned or shifted from its lowered position to a position approximately coinciding with the position formerly occupied by the flame of the gas burner, or, in other words, to the focal point of the lamp. When the gas burner is again to be used the electric lamp is shifted to its lowered or previous position or to a position not in front of the gas burner.

What we claim is:

1. The combination with a lamp having a casing, of a reflector within the casing, a fixed acetylene gas burner within the casing and in front of the reflector, a supplemental light emitting device within the casing, and means for pivotally supporting said supplemental light emitting device so it can be moved from one position to another within the casing of the lamp, for the purpose set forth.

2. The combination with a lamp having a casing and a reflector within the casing, of a standard supporting a gas burner, said standard being located within the casing and said burner in front of the reflector, an incandescent electric lamp within said casing, and means having a pivot supported within the casing and to which means the electric lamp is secured; whereby the electric lamp may be turned to a position away from the front of the gas burner when the burner is in use, and when the latter is not in use to a position adjacent the burner.

3. The combination with a lamp having a casing, of a reflector within the casing, a fixed acetylene gas burner in front of the reflector, a supplemental light emitting device within the casing, and an arm pivoted within the lamp casing and supporting the said supplemental light emitting device; whereby when the gas burner is not in use said supplemental light emitting device may be turned to a position adjacent the said burner.

4. The combination with a lamp having a hollow standard and a fixed acetylene gas burner, of a supplemental light emitting device; two pivotally united clips, one of said clips being secured to the standard and the other to the said supplemental device; and means for holding the said clips in different angular positions.

5. The combination with a lamp having a fixed acetylene gas burner, of an electric light bulb; means for movably supporting said bulb so it can be shifted to a position above the burner when the burner is not in use, and for supporting the same within the lamp and so as not to obstruct the light from the acetylene gas burner when the latter is in use.

In testimony whereof we affix our signatures, in the presence of two witnesses.

EDWARD E. TAYLOR.
DAVID HENRY ELKINS

Witnesses:
MARY A. BOURKE,
ROBERT C. CLARK.